May 4, 1965     H. E. McMAHAN ETAL     3,181,247

GEAR CHECKING APPARATUS AND METHOD

Filed July 13, 1961

INVENTOR.
Herschel E. McMahan &
BY Arthur H. Stoughton

ATTORNEY

United States Patent Office 3,181,247
Patented May 4, 1965

3,181,247
GEAR CHECKING APPARATUS AND METHOD
Herschel E. McMahan, Indianapolis, and Arthur H. Stoughton, Martinsville, Ind., assignors to General Motors Corporation, Detroit, Mich., a corporation of Delaware
Filed July 13, 1961, Ser. No. 123,713
2 Claims. (Cl. 33—179.5)

This invention relates to a gear checking method and apparatus for utilizing the method. In particular, the invention relates to a method and apparatus for checking accumulative spacing error of gear teeth.

The principal object of this invention is to provide a new and improved gear checking method and apparatus to quickly and efficiently determine gear teeth spacing error in production gears. Accordingly, the present invention comprises a master gear and a master gear pitch circle disk mounted on a common drive shaft for uniform rotation. A production gear to be checked and a corresponding pitch circle disk are rotatably mounted on a shaft parallel to the aforementioned drive shaft and are drivingly engaged by the master gear and the master gear pitch circle disk, respectively. A drive without slippage is provided between the master gear pitch circle disk and the production gear pitch circle disk so that the latter will be driven a distance equivalent to the distance a theoretically perfect gear would be driven by the master gear. In order to measure accumulative spacing error of teeth of a production gear, means are provided for determining the difference in angular displacement of the production gear, relative to the angular displacement of the production gear pitch circle disk.

Figure 1:
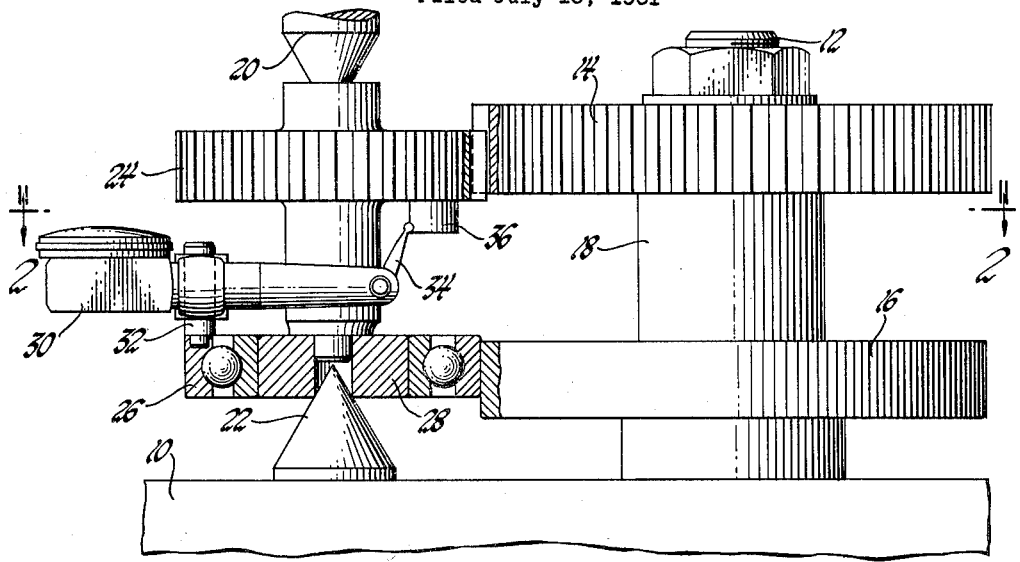
Figure 2:
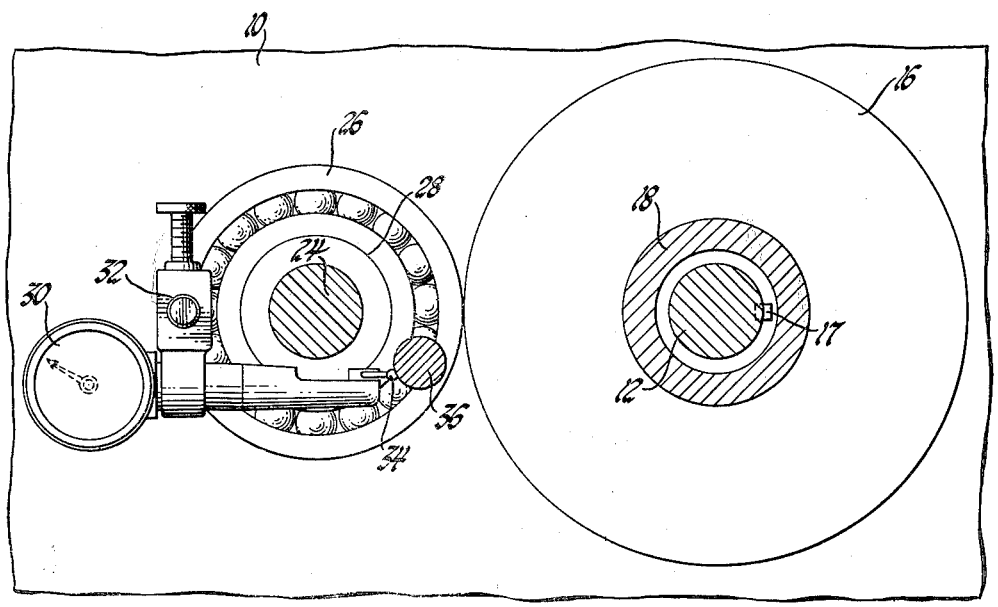

Other objects and advantages of the present invention will be apparent from the following detailed description of an illustrative embodiment of the present invention wherein reference is made to the accompanying drawing, in which:

FIGURE 1 is a side elevational view, partly in section, of apparatus embodying the present invention; and FIGURE 2 is a plan view, partly in section, taken along the line 2—2 in FIGURE 1.

Referring now to the drawings, the apparatus is mounted on any convenient stand or fixture 10. Conventional drive means (not shown) are provided to rotate a drive shaft 12. A master checking gear 14 and a master checking gear pitch circle disk 16 are connected to the drive shaft 12 by key means 17 or the like for rotation therewith. The master checking gear and the pitch circle disk are spaced from one another by a sleeve 18 for a purpose to be hereinafter described. The pitch circle disk 16 has a diameter equal to the pitch circle diameter of the master gear. Conically tapered support pins 20, 22 are provided adjacent the shaft 12 and adapted to rotatably support a production gear 24 and a production gear pitch circle disk 26 about an axis parallel to the axis of rotation of the shaft 12. The production gear and the production gear pitch circle disk are supported by the pins in driven engagement with the master gear checking gear 14 and the master gear checking pitch circle disk 16, respectively. The pitch circle disk 26 has an outer diameter equal to the diameter of the pitch circle of the production gear 24. The pitch circle disk 26 is shown to comprise a ball bearing assembly. The outer race of the ball bearing assembly is freely rotatable relative to a support plate 28 supported by the pin 22 for a purpose to be hereinafter described. Although a production gear 24 of a particular design is shown for illustrative purposes, it is to be understood that any type of production gear or gear arrangement can be checked in the manner to be described.

The production gear 24 is mounted to be freely rotatably driven by the master gear 14 relative to the pitch circle disk 26. The outer periphery of pitch circle disk 26 is mounted in peripheral frictional engagement with the pitch circle disk 16 and is adapted to be driven thereby. The outer race of the ball bearing assembly is freely rotatable and is, therefore, driven by the pitch circle disk 16 without slippage. A dial indicator-type gauge 30 is mounted on the pitch circle disk 26 by a pin 32 and has an indicating finger 34 located at one end thereof. Locating means comprising a removable magnetic block 36 is secured to the lower surface of the production gear 24 in a position of engagement with the actuating finger 34. The aforedescribed arrangement is particularly well suited for checking a production gear without modification thereof to accommodate the checking apparatus. However, it is contemplated that the dial indicator gauge could be mounted elsewhere, such as on the gear to be checked, with the indicating finger in engagement with locating means provided on the pitch circle disk. Furthermore, the locating means might be an integral part of the production gear which could serve the same purpose as the magnetic block 36.

In operation with the master gear 14 and the master gear pitch circle disk 16 mounted on the drive shaft 12, the production gear 24 and the production gear pitch circle disk 26 are rotatably mounted between the pins 20, 22 and are drivingly engaged with the master gear 14 and the master gear pitch circle disc 16, respectively. In this manner, rotation of the master gear and the master gear pitch circle disk 16 at a common rotational speed causes rotation of the production gear 24 and the production gear pitch circle disk 26 at equal rotational speeds. The master gear 14 and the pitch circle disk 16 are shown to be spaced from one another a sufficient distance to permit passage of the gauge 30 therebetween as the gauge 30 is carried with the pitch circle disk 26 by the pin 32. The location of the gauge may be varied so as to vary the spacing and arrangement of the parts without departing from the scope of the invention. The magnetic block 36 is magnetically secured to the production gear 24 in any suitable position of engagement with the indicating finger 34 of the gauge. Since the pitch circle disk 26 and the production gear 24 are driven at constant speeds, the relative positions of the indicator finger 34 and the magnetic block 36 will remain unchanged if the production gear 24 is theoretically perfect. Variations in angular displacement of the production gear 24 and the pitch circle disk 26 will cause the original location of the indicating finger 34 relative to the magnetic block 36 to vary as the parts are rotated. Corresponding deflection of the indicating means for the gauge will provide a reading which represents the angular velocity variation between the production gear 24 and the pitch circle disk 26. The angular velocity variation is directly related to accumulative spacing error of the gear teeth of the production gear.

The scope of this invention is intended to encompass all obvious variations in the details of construction of the apparatus and changes in the arrangements of the parts which will be apparent to those of ordinary skill in the art and which may be necessary to adapt the disclosed invention to various types of production gears.

We claim:

1. Apparatus for checking production gear teeth comprising master gear means secured to a drive shaft for rotating a production gear at a constant speed, master gear pitch circle disk means secured to said shaft and axially spaced from said master gear means and adapted to be driven therewith, a pair of axially spaced conically tapered support pins, a production gear to be checked in driven engagement with said master gear and mounted on said support pins for rotation about an axis parallel to said shaft, production gear pitch circle disk means axially spaced from said production gear in driven engagement with said master gear pitch circle disk means and mounted on said support pins for free rotation relative to said production gear and about said axis and adapted to be driven by said master gear pitch circle disk means, directly readable gauge means positioned between said production gear and production gear pitch circle disk means and fixed to said production gear pitch circle disk means and rotatable therewith in the spaces between said production gear and production gear pitch circle disk means and said master gear means and master gear pitch circle disk means, gauge control means associated with said directly readable gauge means and extending adjacent to said production gear, and locating means magnetically secured to said production gear to engage and displace said gauge control means whereby variations in angular displacement of said production gear relative to said production gear pitch circle disk means during rotation will be reflected by variations in the relative positions of said gauge control means and said locating means and shown on said directly readable gauge means.

2. Apparatus for checking production gear teeth comprising a rotatable drive shaft, master gear means secured to said drive shaft, master gear pitch circle disk means secured to said drive shaft and axially spaced from and concentric with said master gear means, a pair of axially spaced support pins, a production gear to be checked in driven engagement with said master gear means and supported by said support pins for rotation about an axis parallel to said drive shaft, production gear pitch circle disk means including a ball bearing assembly having an inner and outer race means, said inner race means supported by said support pins for rotation about said axis, said outer race means having an outer surface corresponding to the pitch circle of said production gear and in driven engagement with said master gear pitch circle disk means and adapted to be driven thereby, said outer race means being axially spaced from and freely rotatable relative to said production gear, readable gauge means positioned between said production gear and production gear pitch circle disk means and directly connected to said outer race means, gauge control means associated with said readable gauge means and extending adjacent to said production gear, and locating means secured to said production gear arranged to engage and displace said gauge control means whereby variations in angular displacement of said production gear relative to said outer race means during rotation will be reflected by variations in the relative positions of said gauge control means and locating means and shown on said readable gauge means.

References Cited by the Examiner
UNITED STATES PATENTS

| Re. 15,013 | 12/20 | Saurer | 33—179.53 |
| 2,026,784 | 1/36 | Hansen | 33—179.5 |
| 2,656,614 | 10/53 | Mahr | 33—179.53 |
| 2,687,576 | 8/54 | Mahr | 33—179.53 |
| 2,855,691 | 10/58 | Cunningham | 33—179.53 |

ISAAC LISANN, *Primary Examiner.*
LEONARD FORMAN, *Examiner.*